United States Patent
Timothy et al.

(10) Patent No.: US 10,487,407 B2
(45) Date of Patent: Nov. 26, 2019

(54) ELECTROCHEMICAL CELL AND PROCESS

(71) Applicant: SIEMENS AKTIENGESELLSCHAFT, Munich (DE)

(72) Inventors: Hughes Timothy, Wantage (GB); Wilkinson Ian, Witney (GB)

(73) Assignee: Siemens Aktiengesellschaft, Munich (DE)

( * ) Notice: Subject to any disclaimer, the term of this patent is extended or adjusted under 35 U.S.C. 154(b) by 119 days.

(21) Appl. No.: 15/736,873

(22) PCT Filed: Jun. 17, 2016

(86) PCT No.: PCT/EP2016/064020
§ 371 (c)(1),
(2) Date: Dec. 15, 2017

(87) PCT Pub. No.: WO2016/202989
PCT Pub. Date: Dec. 22, 2016

(65) Prior Publication Data
US 2018/0171487 A1    Jun. 21, 2018

(30) Foreign Application Priority Data

Jun. 17, 2015 (GB) .................................. 1510675.0

(51) Int. Cl.
*C25B 1/00* (2006.01)
*C25B 9/06* (2006.01)

(52) U.S. Cl.
CPC ................. *C25B 1/00* (2013.01); *C25B 9/06* (2013.01); *Y02E 60/366* (2013.01)

(58) Field of Classification Search
CPC ..................................... C25B 1/00; C25B 9/06
See application file for complete search history.

(56) References Cited

U.S. PATENT DOCUMENTS

| | | | |
|---|---|---|---|
| 6,712,950 B2 * | 3/2004 | Denvir | C25B 1/00 205/552 |
| 6,881,308 B2 | 4/2005 | Denvir et al. | |
| 8,247,098 B2 | 8/2012 | Gestermann et al. | |
| 8,282,809 B2 | 10/2012 | Friesen et al. | |
| 2002/0017463 A1 | 2/2002 | Merida-Donis | |
| 2003/0164305 A1 | 9/2003 | Denvir et al. | |
| 2005/0029116 A1 | 2/2005 | Bulan et al. | |

(Continued)

FOREIGN PATENT DOCUMENTS

| | | |
|---|---|---|
| CN | 104630811 A | 5/2015 |
| JP | 2009084615 A | 4/2009 |
| WO | WO-01/90444 A1 | 11/2001 |

OTHER PUBLICATIONS

Murakami et al., "Electrolytic Synthesis of Ammonia in Molten Salts under Atmospheric Pressure," J. Am. Chem. Soc., vol. 125, No. 2, pp. 334-335 (2003).

(Continued)

*Primary Examiner* — Arun S Phasge
(74) *Attorney, Agent, or Firm* — Schiff Hardin LLP

(57) ABSTRACT

An electrochemical cell has four volumes. A porous anode is provided between a first volume and a second volume. A ground electrode is provided between the second volume and the third volume. A porous cathode is provided between the third volume and the fourth volume.

8 Claims, 1 Drawing Sheet

(56) References Cited

U.S. PATENT DOCUMENTS

| | | |
|---|---|---|
| 2005/0087449 A1 | 4/2005 | Denvir et al. |
| 2012/0241327 A1 | 9/2012 | Suib et al. |
| 2012/0241328 A1 | 9/2012 | Joshi et al. |
| 2013/0256122 A1 | 10/2013 | Ramanathan et al. |
| 2016/0194767 A1 | 7/2016 | Mulder |

OTHER PUBLICATIONS

Marnellos et al., "Synthesis of Ammonia at Atmospheric Pressure with the Use of Solid State Proton Conductors," Journal of Catalysis, vol. 193, pp. 80-87 (2000).

Lan et al., "Synthesis of ammonia directly from air and water at ambient temperature and pressure," Scientific Reports, vol. 3, 1145. doi:10.1038/srep01145, pp. 1-7 (2013).

Skodra et al., "Electrocatalytic synthesis of ammonia from steam and nitrogen at atmospheric pressure," Solid State Ionics, vol. 180, pp. 1332-1336 (2009).

Murakami et al., "Electrolytic ammonia synthesis from water and nitrogen gas in molten salt under atmospheric pressure," Electrochimica Acta, vol. 50, No. 27, pp. 5423-5426 (2005).

\* cited by examiner

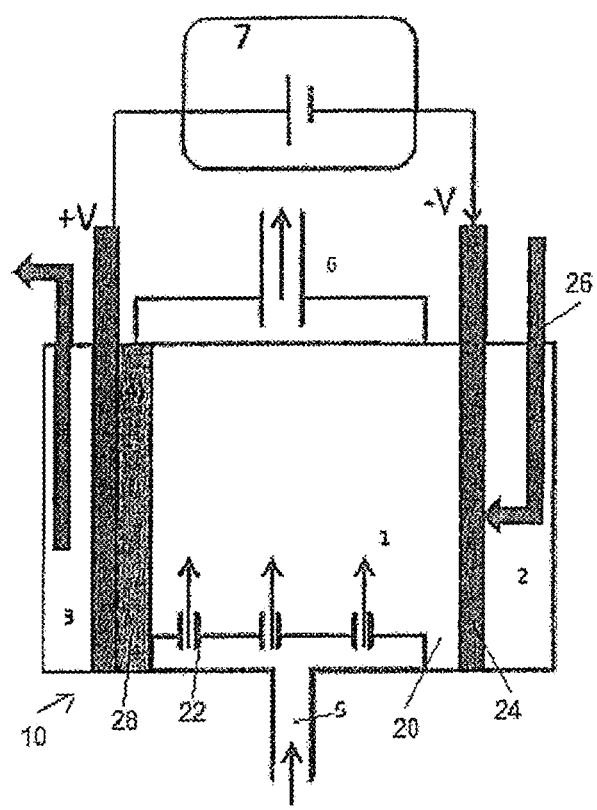

ELECTROCHEMICAL CELL AND PROCESS

BACKGROUND OF THE INVENTION

Field of the Invention

The present invention relates to electrochemical cells, particularly electrochemical cells for synthesis of ammonia $NH_3$. The present invention also relates to processes for synthesis of ammonia $NH_3$.

Description of the Prior Art

Known approaches to the requirement for synthesis of ammonia include:

(1) Haber Bosch process—pressurization and heating of $N_2$ and $H_2$ over an iron catalyst;

(2) Electrochemical synthesis with a molten salt electrolyte and gas electrodes [1-3]; and (3) Electrochemical synthesis with a solid electrolyte and eletrocatalytic electrodes [4-6].

[1] Murakami T., T. Nishikiori, T. Nohira, and Y. Ito, "Electrolytic Synthesis of Ammonia in Molten Salts Under Atmospheric Pressure", J. Amer. Chem. Soc. 125 (2), pp. 334-20 335 (2003).

[2] Murakami T. et al., "Electrolytic Ammonia Synthesis from Water and Nitrogen Gas in Molten Salt Under Atmospheric Pressure", Electrochim. Acta 50 (27), pp. 5423-5426 (2005). [3] U.S. Pat. No. 6,881,308 B2 25 [4] Marnellos, G., Zisekas, S., and Stoukides, M. (2000). Synthesis of ammonia at atmospheric pressure with the use of solid state proton conductors. J. Catal. 193, 80-88. doi:10.1006/jcat.2000.2877

[5] Lan, R., Irvine, J. T. S., and Tao, S. (2013). Synthesis of 30 ammonia directly from air and water at ambient temperature and pressure. Sci. Rep. 3, 1145. doi:10.1038/srep01145 [6] Skodra, A., and Stoukides, M. (2009). Electrocatalytic synthesis of ammonia from steam and nitrogen at atmospheric pressure. Solid State Ionics 180, 1332-1336.

SUMMARY OF THE INVENTION

The present invention seeks to provide alternative methods and apparatus for the synthesis of ammonia from water and nitrogen $N_2$.

BRIEF DESCRIPTION OF THE DRAWINGS

The single FIGURE illustrates an exemplary electrochemical cell as provided by an embodiment of the present invention.

DESCRIPTION OF THE PREFERRED EMBODIMENTS

The embodiment of the invention shown in the FIGURE has an electrochemical cell 10 with three porously partitioned volumes 1-3.

The first volume 1 contains a nitride conductor 20 such as a molten salt eutectic, for example $LiCl/KCl/Li_3N$. In use, steam $H_2O$ is introduced into this first volume through a steam inlet 5. A steam diffuser 22 may be provided to ensure wide distribution of inlet steam.

The second volume 2 is a cathode gas electrode. Nitrogen gas $N_2$ 26 is introduced into this gas electrode, on a surface of the porous electrode 24 away from the nitride conductor 20.

The third volume 3 is an anode gas electrode. A porous electrode 28 is in contact with the nitride conductor 20 on one side.

A DC power supply 7 applies a potential difference between the two porous electrodes 24, 28, with the more positive voltage +V being applied to the anode gas electrode 3 and the more negative voltage −V being applied to the cathode gas electrode 2. Typically, the applied potential difference may be in the region of 0.5 V to 2 V.

In use, nitrogen gas is reduced to nitride ions at the gas cathode 2:

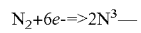

Within the nitride conductor 20, the nitride ions migrate towards the anode under the influence of the voltage gradient between the anode and the cathode. Within the nitride conductor 20, the nitride ions encounter and react with steam (water) to produce ammonia:

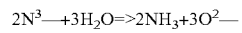

Ammonia is accordingly produced from nitrogen gas and steam.

The ammonia diffuses through the nitride conductor 20 to be evolved at the surface of the nitride conductor. An enclosure 6 traps the evolved ammonia gas and allows it to be harvested. The resulting oxide ions migrate towards the anode under the potential gradient between the electrodes. The anode reaction returns electrons to the DC power supply and generates oxygen into the gas anode electrode:

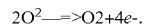

According to a feature of the present invention, an electrically insulating porous material 4, preferably an aerogel material, is placed between the porous anode 28 and the nitride conductor 20. The electrically insulating porous material may be bonded to the porous anode 28 or may simply be immersed in the nitride conductor. Oxide ions O− diffuse through the electrically insulating porous material 4 to the anode 28 under the influence of the potential gradient between the anode 28 and the cathode 24. Water molecules do not tend to diffuse through the electrically insulating porous material due to their neutral charge and therefore lack of driving force under the influence of the potential gradient between the anode 28 and the cathode 24.

The electrically insulating porous material 4 shields the porous anode from the water molecules (steam) within the nitride conductor. In the absence of such an electrically insulating porous material shield, the following unwanted reduction would take place at the anode and would contaminate the evolved ammonia $NH_3$ with hydrogen $H_2$ as well as providing a competing side reaction thereby reducing the efficiency:

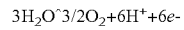

Ammonia gas trapped in enclosure 6 is dried and cleaned as necessary, and may be stored for later use.

The structure of the electrochemical cell of the present invention allows steam $H_2O$ to be used as the source of hydrogen in the ammonia product, rather than hydrogen $H_2$ as was commonly the case in conventional methods and apparatus for synthesising ammonia. This enables the electrochemical synthesis of ammonia $NH_3$ without requiring a separate electrolysis stage to generate hydrogen $H_2$, or the need to buy and store hydrogen $H_2$, resulting in a much simpler system design.

A particular feature of the present invention is the electrically insulating porous material 4 which acts as an electrode protector, preventing steam from reaching the anode. The electrically insulating porous material should be an electrically insulating structure which allows the passage of oxide ions $O^{2-}$ under the influence of the applied potential gradient, but not the diffusion of water molecules $H_2O$.

The electrically insulating porous material may be a sol-gel derived silica aerogel. The texture and porosity of a such an aerogel may be controlled to provide desired properties.

The resulting silica can exist as a relatively dense, microporous xerogel or it can be synthesized as a non-dense, mesoporous aerogel. The three dimensional structure and porosity properties of silica aerogel impart certain advantages in the present application. Surface area can be high (>800 $m^2$/g), average pore size is in the mesoporous regime (2-50 nm), and the pores exist as an interconnected network.

While the present invention has been described with particular reference to the application of ammonia synthesis from steam and nitrogen gas, the electrochemical cell and the synthesis method, of the present invention may be applied to the production of other gaseous products from first and second ionic components.

In general, an inlet is provided for introducing a first source material 5 (in the above example, steam $H_2O$) into the first volume 1 and an inlet is provided for introducing a second source material 26 (in the above example, nitrogen $N_2$) to a 30 cathode 24. An electrolyte (in the above example in the form of the nitride conductor) is provided between anode 28 and cathode 24. Voltages +V and −V are applied respectively to the anode and cathode. At the cathode, a first ionic component (in the above example, $N^{3-}$) is produced from the second source material. The first ionic component traverses the electrolyte under the influence of the voltage gradient between the anode and the ground electrode, toward the anode. Within the electrolyte, the first ionic component encounters the first source material, and a reaction takes place to generate a product (in the above example, ammonia $NH_3$) and an ionic by-product (in the above example, oxide ions $O^2$). The ionic by-product continues to traverse the electrolyte under the influence of the voltage gradient between the anode and the ground electrode, toward the anode. On reaching the anode, the ionic by-product gives up its charge and becomes an evolved by-product (in the above example, oxygen $O_2$).

Means should be provided to collect the product and preferably also the evolved by-product. Means may also be provided to collect any by-products generated at the anode or cathode.

Although the anode is described as a gas electrode arranged for collection of a gaseous by-product, such arrangement may not be necessary in electrochemical cells set up to perform a different reaction. In such cases, it may be sufficient to provide a solid cathode, in which case the third volume 3 may be omitted.

Although modifications and changes may be suggested by those skilled in the art, it is the intention of the Applicant to embody within the patent warranted hereon all changes and modifications as reasonably and properly come within the scope of the Applicant's contribution to the art.

The invention claimed is:

1. An electrochemical cell that generates ammonia $NH_3$ from nitrogen and steam, comprising:
   a volume which contains a nitride conductor and is exposed to respective surfaces of an anode and a gas cathode provided with nitrogen gas;
   a steam inlet that allows entry of steam into the volume;
   a nitrogen inlet that allows entry of nitrogen into the volume;
   the nitride conductor provided in said volume;
   a power supply that applies a positive voltage +V to the anode, and that applies a negative voltage −V to the cathode so as to cause a gaseous product containing ammonia $NH_3$ to be produced;
   an enclosure that traps the gaseous product; and
   an electrically insulating porous material positioned to impede steam from the steam inlet from reaching the anode.

2. An electrochemical cell according to claim 1 wherein the electrically insulating porous material is an aerogel.

3. An electrochemical cell according to claim 2 wherein the aerogel is a sol-gel derived silica.

4. An electrochemical cell according claim 1 wherein said volume is a first volume, and wherein the gas cathode comprises a porous cathode and a second volume.

5. An electrochemical cell according to claim 4 wherein the anode is a gas electrode, comprising a porous anode and a third volume.

6. An electrochemical cell according to claim 1 wherein the steam inlet is provided with a steam diffuser.

7. A method for generating ammonia $NH_3$, comprising:
   in a first volume of an electrochemical cell, exposing nitride conductor to respective surfaces of an anode and a gas cathode;
   introducing steam $H_2O$ into the volume;
   introducing nitrogen gas into the volume;
   applying a positive voltage +V to the anode;
   applying a negative voltage −V to the cathode, wherein said cathode comprises a porous cathode and a second volume;
   reacting said nitrogen gas of said cathode in order to produce nitride ions $N^{3-}$ in an electrolyte in said first volume;
   generating $NH_3$ by reacting said nitride ions $N^{3-}$ and said steam $H_2O$; and
   collecting said ammonia $NH_3$ in said first volume.

8. A method according to claim 7, further comprising collecting a by-product generated at the anode.

* * * * *